United States Patent [19]

Commereuc et al.

[11] Patent Number: 4,721,762

[45] Date of Patent: Jan. 26, 1988

[54] PROCESS FOR MANUFACTURING AN ETHYLENE-1-BUTENE COPOLYMER FROM ETHYLENE

[75] Inventors: Dominique Commereuc, Meudon; Francois Hugues, Nanterre; Nhuong Le Quan, Aubergenville; Adberrahim Taouli, Rueil-Malmaison, all of France

[73] Assignee: Institut Francais du Petrole, Rueil-Malmaison, France

[21] Appl. No.: 742,442

[22] Filed: Jun. 7, 1985

[30] Foreign Application Priority Data

Jun. 8, 1984 [FR] France ............... 84 09179

[51] Int. Cl.$^4$ .................. C08F 4/64; C08F 210/02
[52] U.S. Cl. .................... 526/75; 502/126; 526/119; 526/125; 526/151; 526/348.6; 526/907; 585/512
[58] Field of Search ......................... 526/75

[56] References Cited

U.S. PATENT DOCUMENTS

| | | |
|---|---|---|
| 2,943,125 | 6/1960 | Ziegler . |
| 2,953,552 | 9/1960 | Stampa et al. ............ 526/119 |
| 3,050,471 | 8/1962 | Anderson et al. ......... 526/142 |
| 3,116,274 | 12/1963 | Boehm et al. ............ 526/142 |
| 3,336,278 | 8/1967 | Ploetz et al. ............. 526/75 |
| 3,969,429 | 7/1976 | Belov et al. ............. 385/512 |
| 4,133,944 | 1/1979 | Cooper et al. ........... 526/65 |
| 4,172,050 | 10/1979 | Gersell .................. 526/151 |
| 4,296,223 | 10/1981 | Berger ................... 526/125 |
| 4,308,369 | 12/1981 | Shipley et al. ......... 526/151 |
| 4,312,783 | 1/1982 | Sakurai et al. . |
| 4,319,011 | 3/1982 | Lowery et al. .......... 526/125 |
| 4,370,456 | 1/1983 | George . |
| 4,532,370 | 7/1985 | Le Quan et al. . |
| 4,615,998 | 10/1986 | Le Quan et al. . |

FOREIGN PATENT DOCUMENTS

| | | | |
|---|---|---|---|
| 135441 | 3/1985 | European Pat. Off. . | |
| 455082 | 4/1975 | U.S.S.R. ............... | 585/512 |

OTHER PUBLICATIONS

Modern Petroleum Technology: Hobson & Pohl, Applied Science Ltd., 4th ed. (1973).

Primary Examiner—Edward J. Smith
Attorney, Agent, or Firm—Millen & White

[57] ABSTRACT

The invention concerns a process for manufacturing low density linear polyethylene by copolymerizing ethylene and 1-butene, comprising the steps of:

(a) dimerizing ethylene to 1-butene in the presence of a soluble catalyst comprising: an alkyl titanate, an aluminum compound of formula $AlR_3$ or $AlR_2H$, wherein R is a hydrocarbyl radical, and an ether;

(b) contacting at least a portion of the product obtained in step (a) with an inorganic compound, at least partly insoluble;

(c) contacting the insoluble mixture obtained in step (b) with an halogenated aluminum compound of formula $Al_2R'_{6-n}X_n$, wherein R' is a hydrocarbyl radical, X a halogen atom, and n a number from 3 to 6, when an halogenated aluminum compound is not already present in said mixture;

(d) using the resultant product, containing at least one inorganic carrier, at least one halogenated aluminum compound and at least one titanium compound, as catalyst in the polymerization reactor.

19 Claims, No Drawings

PROCESS FOR MANUFACTURING AN ETHYLENE-1-BUTENE COPOLYMER FROM ETHYLENE

The present invention has as an object a process for dimerizing ethylene to 1-butene and copolymerizing ethylene with 1-butene to obtain low density linear polyethylene.

BACKGROUND OF THE INVENTION

Many processes for obtaining copolymers of ethylene with 1-butene are already known. They operate either in gaseous phase without solvent or in liquid phase. These processes have many advantages as compared to the previous methods, such as high specific activity of the catalyst, power savings or simplified operating flowsheets. Practically it is often difficult to obtain 1-butene with the purity required to gain the benefit of all the advantages of these new processes.

As a matter of fact, 1-butene is mostly obtained by extraction from a cracking olefinic cut and unavoidably contains more or less subtantial amounts of the contaminents contained in said cut, for example isobutene, butadiene, 2-butene, butane and/or acetylenic hydrocarbons which either deactivate the catalyst or modify the molecular weight or consist merely of inert compounds increasing the weight of the recycled fractions.

One way of obtaining much purer 1-butene is to prepare it by selective dimerization of ethylene; the principle of such a process has been disclosed by K. ZIEGLER in U.S. Pat. No. 2,943,125 and has been considerably improved by using certain techniques such as disclosed in the European patent application No. EP-A-135 441 equivalent to U.S. Pat. No. 4,532,370, recommending as a catalyst alkyl titanate, trialkylaluminum and a modifier, with definite ratios and conditions of use.

This means provided a substantial improvement to the copolymerization process as a result of the use of the same starting material, ethylene, and of the purity of the produced 1-butene; but, on the other hand, it required the implementation, in addition to the copolymerization plant, of a second plant for a second process requiring its own catalyst and systems for removing inorganic compounds and for fractionation of ethylene, butene and unavoidable oligomers, and for recycling.

Now, it has been found that the titanium-containing catalyst already used for dimerizing ethylene to 1-butene and which is completely soluble in the reaction liquid medium is perfectly suitable for the preparation of a highly active catalyst in ethylene polymerization and ethylene copolymerization with 1-butene, in low temperature as well as in high temperature vapor phase processes, i.e. processes operating beyond 140° C., at which temperatures the polymer becomes soluble in hydrocarbons or is in molten state.

As a result of this discovery, it is now possible to integrate the two processes to make them complementary of each other, without needing any catalyst removal, costly separations or recycling. The catalyst activity in each of the two steps is particularly well adapted to an integration since in the dimerization phase, it can produce from 20 to 100 kg of 1-butene per involved gram of titanium and, in the polymerization phase, it can produce 200 to 1000 kg of an ethylene-1-butene copolymer containing about 10% by weight of 1-butene per gram of titanium. Such an activity makes it unnecessary to remove the inorganic content of the polymer, all the catalyst elements being kept therein.

SUMMARY OF THE INVENTION

The process for manufacturing an ethylene-1-butene copolymer according to the present invention comprises the following steps of:

(a) dimerizing ethylene to 1-butene by contacting ethylene with a solution of a catalyst obtained by interaction of at least one alkyl titanate and at least one aluminum compound of formula $AlR_3$ or $AlR_2H$ wherein each of the radicals R is a hydrocarbyl radical;

(b) contacting at least a portion of the effluent from step (a) wherein at least a part of the dimerization catalyst is dissolved, with at least one inorganic compound of at least one metal selected from the group formed of magnesium and aluminum, said inorganic compound being at least partly insoluble, so as to obtain an insoluble mixture formed of said inorganic compound impregnated with elements of the dimerization catalyst;

(c) in the absence of a halogenated aluminum compound in the mixture from step b), contacting said insoluble mixture with at least one halogenated aluminum compound of formula $Al_2R'_{6-n}X_n$ wherein R' is a hydrocarbyl radical, X a halogen atom and n a number from 3 to 6;

(d) contacting the product obtained in step (c) or the product obtained in step (b) formed of at least one inorganic compound that is at least partly insoluble, at least one halogenated aluminum compound and at least one titanium compound, with ethylene and 1-butene within the polymerization reactor.

According to the process of this invention, the dimerization catalyst is obtained by interaction, in a hydrocarbon solvent and preferably in one of the reaction products, of at least one alkyl titanate and at least one aluminum compound of formula $AlR_3$ or $AlR_2H$ wherein each of the radicals R is a hydrocarbyl radical and preferably in the presence of at least one base such as an ether.

The polymerization catalyst comprises:
(a) the above-formed complex already used for dimerizing ethylene to 1-butene,
(b) at least one inorganic carrier such as an inorganic insoluble compound, for example a metal oxide or halide or their mixture,
(c) at least one alkyl-aluminum halide or one aluminum halide.

Without being bound by any theory, it can be assumed that the selectivity of the dimerization is achieved by a tetravalent form of titanium, whereas, by action of the inorganic compounds, particularly the inorganic halides, $Ti^{IV}$ decomposes to $Ti^{III}$ which is the active form of the polymerization catalyst.

The titanium compound, as used according to the invention, complies with the general formula $Ti(OR'')_4$ wherein R'' is a hydrocarbyl radical, for example a linear or branched, cyclic or acyclic, saturated or unsaturated, optionally aromatic, alkyl radical having 2 to 10 carbon atoms. Examples are tetraethyl titanate, tetrapropyl titanate, tetraisopropyl titanate, tetra-n-butyl titanate, tetra-2-ethyl-hexyl titanate, tetraoctyl titanate.

The aluminum compounds to be used for manufacturing the dimerization catalyst have the general formulas $AlR_3$ or $AlR_2H$ wherein R has the same definition as R'' herebefore. For example triethylaluminum, triisobutylaluminum, tripropylaluminum, trihexylaluminum, triisohexylaluminum or diisobutylaluminum hydride can be used.

Preferably, the dimerization catalyst contains a third component which preferably is a cyclic or acyclic ether. For example, diethylether, dimethylether, methyl-tert-butyl-ether and dihydropyran can be used, but tetrahydrofuran, 2-methyl-tetrahydrofuran or 1,4-dioxane are preferred.

These 3 elements are used in molar ratios Al/Ti from 2 to 5 and ether/Ti from 1 to 30. They are admixed with a saturated or unsaturated hydrocarbon such as pentane, hexane, heptane or with trimer or tetramer by-products of the dimerization reaction such as 2-ethyl 1-butene, 1-hexene, 3-methyl 1-pentene or mixtures thereof; the temperature of the interaction being from $-30°$ to $+60°$ C.

The insoluble inorganic compound used as carrier for manufacturing the polymerization catalyst may be a metal oxide such for example as aluminum oxide or magnesium oxide in their various forms. Aluminum silicate or magnesium carbonate may also be used. Preferably, a magnesium halide and more particularly magnesium chloride or bromide are preferred. The latter may be obtained in a high dispersion state either by crushing magnesium chloride or bromide as obtained in a conventional manner of inorganic chemistry, or by reacting a magnesium organic compound, for example an organomagnesium compound with a halogenated compound.

Then, the preferred organo-magnesium compounds are dialkylmagnesiums of general formula Mg $R_1R_2$ or the products of their association with trialkylaluminum, such as Mg $R_1R_2$. $AlR_3$, soluble in hydrocarbons, radicals $R_1$ and $R_2$ being defined as the above-mentioned radical R. Butyl-isobutyl-magnesium, isopropyl-butyl-magnesium, dihexylmagnesium, octyl-butylmagnesium, diphenylmagnesium or dibenzylmagnesium for example, can be used.

The halogenated compounds used according to the invention are:

(a) hydrogen halides in anhydrous state such for example as hydrochloric acid and hydrobromic acid;
(b) organic halides of general formula RX, wherein X is a halogen atom (fluorine, bromine, chlorine or iodine, preferably chlorine or bromine), R being defined as above. Compounds with mobile halogens such as allyl and benzyl halides, for example allyl chloride and benzyl chloride, ethylchloride, butyl chloride and t-butyl chloride are particularly suitable.

Polyhalogenated hydrocarbons such, for example, as carbon tetrachloride, dichloromethane and bromoform and acid halides, such for example as acetyl chloride and propionyl chloride, can also be used;
(c) inorganic halides.

The latter comprise metal halides such, for example, as aluminum, boron, tin, mercury halides and complexes of these halides with bases; compounds formed by halogens with metalloids, such as sulfur or phosphorus halides. From these compounds the preferred are aluminum trichloride, boron trichloride, tin tetrabromide, mercury dichloride, phosphorous trichloride or sulfuryl chloride.

Aluminum halides or alkylaluminum halides used as third component of the polymerization catalyst formula can also be used as halogenation compounds.

Aluminum halides or alkylaluminum halides used in the formation of the polymerization catalyst comply with the general formula $Al_2R'_{6-n}X_n$ wherein $R'$ has the same definition as $R''$, hereabove, X is a halogen and preferably bromine or chlorine and the value of n is 3, 4, 5 or 6. From these compounds, aluminum chloride, dichloroethylaluminum, ethylaluminum sesquichloride and dichloroisobutylaluminum are of particular interest.

The components of the polymerization catalyst are preferably used in such proportions that 1 millimole of titanium contained in the catalyst already used in the dimerization will be contacted with a carrier amount from about 0.1 to about 100 grams.

The amount of aluminum halide or alkylaluminum halide will be such that the molar ratio "halide ion/total aluminum" be from about 0.5 to about 1.5 and the molar ratio "total aluminum/titanium" be from about 2.5 to about 25.

The preferred operating technique according to the invention is described hereinafter.

The ethylene dimerization is performed with the use of a catalyst prepared as above, either in a semi-open system or in an open system, by contacting said catalyst with ethylene under a pressure of 0.5 to 5 MPa, at a temperature from 20° to 80° C. After reaction periods from 0.5 to 10 h, the reaction product, which contains ethylene, 1-butene, hexenes, octenes and the dissolved catalyst may be subjected to several modes of treatments.

According to a first mode, ethylene and 1-butene are separated by a first distillation and supplied, with the complementary amount of fresh ethylene required for the copolymer composition, to the polymerization reactor. A second distillation provides for the recovery, as top fraction, of the major part of the hexenes which are partly used for manufacturing the dimerization catalyst and partly removed. The remainder of the solution, containing octenes, a fraction of hexenes and the dissolved dimerization catalyst, is contacted with the inorganic carrier, until discoloration occurs.

The carrier thus impregnated with titanium is optionally isolated by any conventional method such as for example, filtration or centrifugation, then is optionally washed with an aliphatic saturated hydrocarbon or with 1-butene; it is then optionally treated with at least one aluminum halide or alkylaluminum halide when the halogenated aluminum compound is not already present, and fed to the polymerization reactor.

According to a second mode, the total dimerization effluent is contacted with the inorganic carrier, until discoloration of the solution occurs. Then the so-impregnated carrier is separated, optionally washed with a saturated aliphatic hydrocarbon or with 1-butene. All the hydrocarbons obtained by this treatment are subjected to fractional distillation:

Ethylene and 1-butene are fed, with the required complementary amount of fresh ethylene, to the polymerization reactor; hexenes and octenes are partly recycled for use in the dimerization catalyst manufacture and partly removed. The impregnated catalyst carrier already used in the dimerization is optionally treated with at least one aluminum halide or alkylaluminum halide when a halogenated aluminum compound is not already present, and fed to the polymerization reactor.

According to a third mode, the totality of the dimerization effluent is contacted with the inorganic carrier until discoloration of the solution occurs, the so-obtained catalyst suspension is then optionally treated with at least one aluminum halide or alkylaluminum halide when a halogenated aluminum compound is not already present. The whole effluent, containing ethylene, 1-butene, hexenes, octenes and the suspended catalyst formed of at least one inorganic carrier, at least one halogenated aluminum compound and at least one titanium compound, is fed in totality to the polymerization reactor, with a complementary ethylene amount.

The polymerization is conducted either in vapor phase at temperatures lower than 100° C., according to known techniques, or in liquid phase, at temperatures higher than 140° C., the polymer being either molten or dissolved.

EXAMPLES

The following examples illustrate the invention without limiting the scope thereof.

EXAMPLE 1

In a stainless steel autoclave of 0.5 liter volume capacity, provided with a double jacket with water circulation and a stirring system, previously purged of air and moistness, and maintained at 20° C. under an ethylene pressure of 0.1 MPa, were introduced, in successive order: 2.5 ml of a solution containing $4.5 \cdot 10^{-4}$ mole of triethylaluminum in an "hexenes" fraction obtained during a preceding operation (containing by weight 33% of 3-methyl pentene, 12% of 1-hexene and 55% of 2-ethylbutene), and then 2.5 ml of a solution containing $1.5 \cdot 10^{-4}$ mole of butyl titanate and $3 \cdot 10^{-4}$ mole of tetrahydrofuran in the same "hexenes" fraction. The temperature was brought to 55° C. and the pressure to 2 MPa by means of ethylene and these conditions were maintained for 4 hours, during which 225 g of ethylene have been absorbed. The autoclave content was then subjected to fractional distillation whereby 39 g of unconverted ethylene and 172 g of 1-butene were recovered, the remainder consisting of 13 g of a mixture of hexenes and octenes wherein the catalyst was dissolved. This solution will be used to prepare the catalyst destined to the polymerization.

$6.9 \cdot 10^{-3}$ mole of dichloroethylaluminum and $5.7 \cdot 10^{-3}$ mole of butylethylmagnesium, dissolved in heptane, were successively introduced into 373 ml of heptane. A dark brown solution containing the catalyst previously used for dimerization was added to the formed very light yellow precipitate of magnesium chloride and the mixture stirred up to discoloration. Then 25 ml of said very light brown suspension were introduced in an autoclave of 1.5 liter, previously purged of air and moistness and maintained at 60° C. The autoclave was then fed with a mixture containing 17% by weight of 1-butene and 83% of ethylene, while maintaining the pressure at 1.6 MPa.

After 4 hours of reaction, 365 g of copolymer were obtained.

EXAMPLE 2

Ethylene dimerization was performed in the same conditions and with the same catalyst as in example 1, but the products issued from the dimerization step were not separated.

On the other hand, $2.8 \cdot 10^{-3}$ mole of butylethylmagnesium dissolved in heptane and $5.6 \cdot 10^{-3}$ mole of t-butyl chloride have been introduced into 25 ml of hexenes issued from a preceding dimerization operation. The resultant magnesium chloride suspension was settled, the precipitate washed 3 times with 20 ml of hexane and then introduced in the raw mixture issued from the dimerization and stirred, up to discoloration of the solution.

The hydrocarbons were separated from the catalyst and fractionated, ethylene and 1-butene being destined to polymerization and the hexenes and octenes removed.

The solid catalyst was washed 3 times with 20 ml of heptane and suspended again in 400 ml of heptane.

25 ml of the catalyst suspension and $1.2 \cdot 10^{-5}$ mole of ethylaluminum sesquichloride were introduced in an autoclave of 1.5 l, previously purged of air and moistness and maintained at 60° C. The autoclave was then fed with a mixture containing by weight, 17% of 1-butene and 83% of ethylene, while maintaining the pressure at 1.5 MPa. After 4 hours of reaction, 350 g of copolymer were obtained.

EXAMPLE 3

Ethylene dimerization was performed as in example 1, but the products issued from the dimerization were not separated.

On the other hand, an amount of magnesium chloride suspension prepared in the same manner as in example 1 and containing $3.5 \cdot 10^{-4}$ mole of said chloride was introduced directly in the raw dimerization product. The whole mixture was transferred to an autoclave of 1.5 liter capacity pressurised at 1.5 MPa by means of ethylene, and whose temperature was brought to 60° C.

After 4 hours of reaction, 150 g of copolymer were obtained.

What is claimed as the invention is:

1. In a process for manufacturing an ethylene-1-butene copolymer, comprising:
   (a) dimerizing ethylene to 1-butene by contacting ethylene with a catalyst solution obtained by interaction of at least one alkyltitanate with at least one aluminum compound,
   (b) contacting at least one portion of the effluent from step (a), wherein at least a part of the dimerization catalyst is dissolved, with at least one inorganic magnesium or aluminum compound, said inorganic compound being at least partly insoluble, so as to obtain an insoluble mixture formed of said inorganic compound impregnated with the dimerization catalyst elements,
   (c) contacting said insoluble mixture with at least one halogenated aluminum compound of formula $Al_2R'_{6-n}X_n$ wherein R' is a hydrocarbyl radical, X a halogen atom and n a number in the range of 3–6, when the insoluble mixture obtained in step (b) does not already contain a halogenated aluminum compound,
   (d) contacting the product obtained in step (c) or the product obtained in step (b), formed of at least one partly insoluble inorganic compound, at least one aluminum halogenated compound and at least one titanium compound, with the ethylene and 1-butene from Step 2),
   the improvement wherein in step (a) the dimerization catalyst is a product of the reaction of: (1) a solution, in a hydrocarbon solvent, consisting essentially of at least one aluminum compound of the formula $AlR_3$ or $AlR_2H$ wherein each of the radicals R represents hydrocarbyl, with (2) a preformed solution consisting essentially of a hydrocarbon solvent, at least one ether and at least one alkyltitanate, the ether/Ti molar ratio in step (a)

being about 1:1–30:1 and the Al/Ti molar ratio in step (a) being about 2:1–5:1.

2. A process according to claim 1, wherein the dimerization effluent from step (a) is fed to a fractionation zone wherein are separated:
   (α) at least one fraction containing 1-butene and ethylene, said fraction being fed to a polymerization reactor,
   (β) at least one fraction containing hexenes which are at least partly used as solvent for the preparation of the dimerization catalyst of step (a), and
   (γ) at least one fraction wherein the catalyst already used for the dimerization is dissolved.

3. A process according to claim 1, wherein the dimerization effluent from step (a) is used in totality in step (b), and the effluent obtained from step (b), after separation of the solid insoluble mixture, is fed to a fractionation zone wherein are separated:
   (α) at least one fraction containing 1-butene and ethylene, said fraction being fed to a polymerization reactor, and
   (β) at least one fraction containing hexenes which are at least partly used as solvent for the preparation of the dimerization catalyst of step (a).

4. A process according to claim 1, wherein the dimerization effluent obtained in step (a) is used in totality in step (b), the totality of the product obtained in step (b) is optionally fed to step (c), when an aluminum halogenated compound is not already present, the whole effluent, containing ethylene, 1-butene, hexenes and a suspended precipitate formed of at least one inorganic compound, at least partly insoluble, at least one halogenated aluminum compound and at least one titanium compound, is fed in totality to a polymerization reactor wherein said total effluent is contacted with an additional ethylene amount.

5. A process according to claim 1, wherein the inorganic compound used in step (b) consists essentially of at least one magnesium halide.

6. A process according to claim 1, wherein, in step (b), at least one inorganic magnesium compound is formed in situ by reacting at least one organic magnesium compound with at least one halogenated compound.

7. A process according to claim 6, wherein at least one organomagnesium compound or is product of association with a trialkyl aluminum is reacted with at least one aluminum halide or one alkylaluminum halide.

8. A process according to claim 1, wherein the amount of inorganic compound used in step (b) is from about 0.1 to about 100 grams per millimole of titanium.

9. A process according to claim 1, wherein the amount of halogenated aluminum compound is such that the molar ratio "halide ion/total aluminum" is from about 0.5 to about 1.5 and the molar ratio "total aluminum/titanium" is from about 2.5 to about 25.

10. A process according to claim 5, wherein the magnesium halide is magnesium chloride.

11. A process according to claim 1, wherein the ether is diethylether, dimethylether, methyl tert-butyl ether, dihydropyran, tetrahydrofuran, 2-methyl-tetrahydrofuran or 1,4-dioxane.

12. A process according to claim 11, wherein the ether is tetrahydrofuran, 2-methyl-tetrahydrofuran or 1,4-dioxane.

13. A process according to claim 1, wherein the hydrocarbon solvent is pentane, hexane or heptane.

14. A process according to claim 1, wherein the hydrocarbon solvent is a by-product of the dimerization reaction of step (a).

15. A process according to claim 14, wherein the by-product of the dimerization reaction of step (a) is 2-ethyl-1-butene, 1-hexene, 3-methyl-1-pentene or a mixture thereof.

16. A process according to claim 1, wherein the ether is tetrahydrofuran and the hydrocarbon solvent is a mixture of 3-methyl pentene, 1-hexene and 2-ethylbutene.

17. A process according to claim 1, wherein in step (a) the dimerization catalyst results from the interaction of triethylaluminum in a hexene fraction with a solution of butyltitanate and tetrahydrofuran in the same hexene fraction.

18. A process according to claim 1, wherein the reaction is performed in a solvent comprising an olefinic hydrocarbon.

19. A process according to claim 1, wherein in the catalyst, the alkyltitanate has the formula $Ti(OR'')_4$ and $R''$ is $C_{2-10}$ alkyl.

* * * * *